Aug. 13, 1935.   B. COGSWELL   2,011,396
ELECTRICAL LOAD REGULATING SYSTEM
Filed Jan. 25, 1934
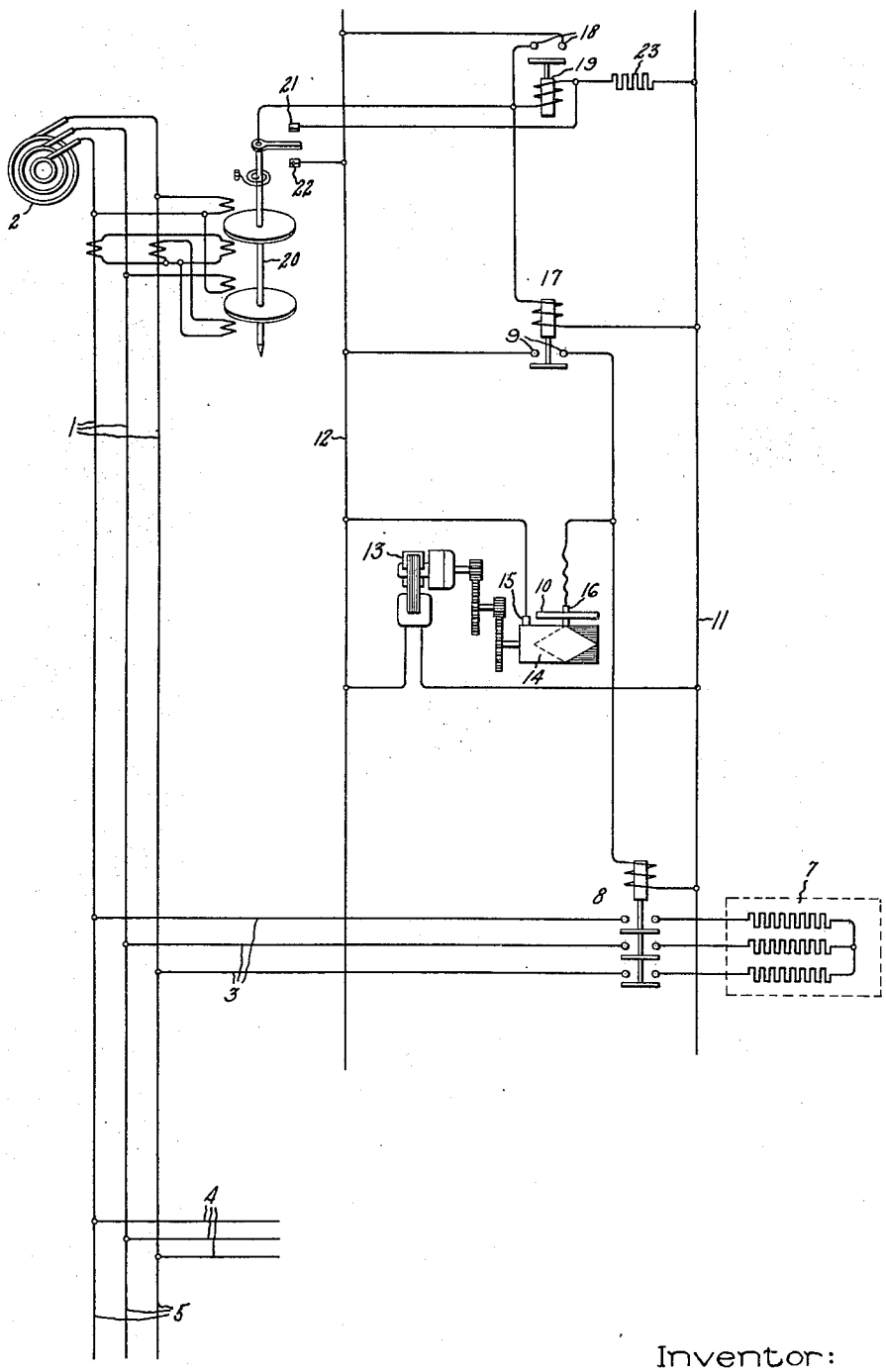
Inventor:
Burnham Cogswell,
by Harry E. Dunham
His Attorney Patented Aug. 13, 1935

2,011,396

UNITED STATES PATENT OFFICE 2,011,396

ELECTRICAL LOAD REGULATING SYSTEM

Burnham Cogswell, Kenmore, N. Y., assignor to General Electric Company, a corporation of New York Application January 25, 1934, Serial No. 708,237

7 Claims. (Cl. 13—1)

My invention relates to electrical load regulating systems, and more particularly to systems of this character in which the effective load value of one or more load devices is varied in accordance with changes in the total load on an electric power circuit.

It is often desirable to limit, or to regulate, the load on an electric power circuit. This is usually done automatically by means of an element which is responsive to the load on the circuit and which acts to disconnect one or more load increments, or devices, from the circuit when the total load thereon exceeds a predetermined value. It has been found that certain load devices cannot be disconnected from a power circuit at all without seriously adversely affecting their operation or the operation of the manufacturing or industrial process of which they form a part, whereas other load devices are not so sensitive to disconnection. However, no load device can be disconnected indefinitely from the power circuit which normally energizes it without in the end adversely affecting its operation, and consequently the operation of any process of which it forms a part. However, overloads, notwithstanding the removal of one or more load devices from the circuit, sometimes last so long as to result in an adverse effect on almost any load device which is disconnected from the circuit for the duration of the overload. In the past, this problem has been taken care of in various ways.

In accordance with my invention, I provide a novel arrangement for eliminating this difficulty. This arrangement comprises essentially the correlation of a time controlled circuit controller and a load controlled circuit controller in such a manner that during overloads the load increment which acts as a regulating element for the load is periodically disconnected from and reconnected to the circuit in such a time cycle as to provide an average energization for the load increment which is sufficient to allow it to give satisfactory operation.

My invention will be better understood from the following description taken in connection with the accompanying drawing and its scope will be pointed out in the appended claims.

Referring now to the single figure of the accompanying drawing, I have shown therein diagrammatically an embodiment of my invention consisting of an electric power circuit 1, which is energized by any suitable means, such as by a generator 2, and which has connected thereto a variable load comprising a plurality of load circuits 3, 4 and 5. Load circuit 3 is connected to supply one of those load devices whose operation is not materially adversely affected by short time interruptions of current, and as an example of such a load device there is illustrated a resistance type electric furnace 7. A relay or contactor 8 is arranged to control the connection of furnace 7 to load circuit 3.

For controlling the operation of contactor 8, I provide two sets of contacts 9 and 10, respectively, which are connected in parallel with each other in an energizing circuit for the contactor 8. As shown, one terminal of the operating coil of the contactor 8 is connected to a conductor 11, which may be considered as one side of a suitable source of control current, while the other terminal of the coil of the contactor 8 is connected to the contacts 9 and 10 in parallel and these contacts, in turn, are connected to the other side 12, of the source of control current. Contacts 10 are adapted to be operated by a timer, which may be of any suitable type. As shown, this timer comprises a motor 13 connected across the supply bus 11—12 and this motor is geared to a drum 14, partly composed of insulation and partly composed of conducting material. A brush 15 rides on the conductive material and a slidable, or adjustable brush 16 may be moved so as to ride continually on the conducting material or substantially continually on the insulating material, or in intermediate positions it will ride alternately on conducting and insulating material. In this manner an electric circuit through the contacts 10, that is, between the brushes 15 and 16, may be intermittently made and broken and the ratio of time of make to time of break may be adjusted at will by sliding the brush 16.

The contacts 9 are controlled by a relay 17 which is in turn controlled by the contacts 18 of an auxiliary relay 19. Relay 19 is in turn controlled by a load responsive circuit controller which is shown by way of example as a contact making wattmeter 20, connected to circuit 1 in the conventional manner. This device is provided with a set of overpower closing contacts 21 and a set of underpower closing contacts 22. By over and underpower closing contacts is meant contacts which close when the total load on circuit 1 is above or below, respectively, a predetermined value or limit. The underpower closing contacts are in a circuit which may be traced from the supply line 12 through the contacts 22, the energizing coil of the relay 19 and a current limiting resistor 23 to the supply line 11. The overpower closing contacts 21 are connected so as to short circuit the energizing coil of relay 19 when these contacts close.

The operation of the illustrated embodiment of my invention is as follows: Assume that generator 2 is being operated by any suitable prime mover (not shown) and that it is generating power which is transmitted over circuit 1 to the various load circuits 3—4—5. The illustrated position of relay 19 shows that the total load on circuit 1 is above a predetermined allowable value.

As the contacts 18 of relay 19 are opened, relay 17 is deenergized and the contacts 9 are open as shown. The result is that the timer operates to cause intermittent energization of the contactor 8 and consequently to cause intermittent operation or energization of the furnace 7. The brush 16 is adjusted so that the ratio of the time of closure of the contacts 10 to the time when they are open is such as to provide at least a minimum average value of energization for the furnace 7. Consequently, overload conditions may be maintained indefinitely on the circuit 1 without materially adversely affecting the operation of the furnace 7.

Assume now that the total load on circuit 1 drops below an objectionably high value. When this occurs, the underpower closing contacts 22 will close, thereby completing the energizing circuit for the relay 19. This relay will pick up and when its contacts 18 close two circuits are completed. One circuit is a holding circuit for the relay 19 and includes the contacts 18 and the resistor 23. The other circuit is the energizing circuit through the contacts 18 for the relay 17. This relay will then pick up closing its contacts 9 with the result that the relay 8 will be energized therethrough continuously, regardless of the operation of the timer. If now the power or load on circuit 1 exceeds a predetermined value the overpower closing contacts 21 will close thereby short circuiting the relay 19 and causing it to drop out. This causes the relay 17 to drop out, thereby opening the contacts 9 and putting the contactor 8 under the control of the timer.

From the above it will be seen that I have provided a system in which, during normal operation, that is to say, during operation when the load on circuit 1 is not excessive, the furnace, or load 7 will be continuously connected to the power circuit, but when overload conditions exist, the load increment 7 will be connected to the circuit 1 during the early or first portion of successive time intervals, but will be disconnected therefrom during the latter portion of said time intervals, or time cycles. The length of the early and late portions of the cycle may be relatively varied by adjusting the timer as previously described. It is immaterial to my invention what the total time of the time cycle is, and one such cycle which I contemplate using is a two minute cycle in which the timer is so adjusted that the contacts are closed for the first minute and are open for the second minute.

While I have shown and described a particular embodiment of my invention, it will be obvious to those skilled in the art that changes and modifications may be made without departing from my invention, and I therefore aim in the appended claims to cover all such changes and modifications as fall within the true spirit and scope of my invention.

What I claim as new and desire to secure by Letters Patent of the United States is:

1. In combination, an electric power circuit, a variable load adapted to be connected thereto, and means including both a circuit controller responsive to the load on said circuit and a time controlled circuit controller for jointly causing an intermittent reduction in the load on said circuit if the load on said circuit is above a predetermined value.

2. In combination, an electric power circuit, a load increment connected to said circuit and adapted to have its effective load value varied, and means including two sets of parallel connected contacts for reducing the effective load value of said increment during the latter portion of successive time cycles if the total load on said circuit is above a predetermined value.

3. In combination, an electric power circuit, a load device connected to said circuit, means including two sets of contacts for controlling the effective load value of said load device, a timer for periodically opening and closing one of said sets of contacts, and a means responsive to the load of said power circuit for controlling the other set of contacts.

4. In combination, an electric power circuit, a variable load including a load device whose operation is not materially adversely affected by periodic energization normally continuously connected to said circuit, means responsive to overloads on said circuit for disconnecting said load device from said circuit, and time controlled means for making said disconnection periodic in character.

5. In combination, an electric power circuit, a load increment, a contactor for connecting said load increment to said circuit, an energizing circuit for said contactor including two electrically parallel sets of contacts, a timer for periodically opening and closing one of said sets of contacts, a relay for operating the other set of contacts, a second relay having a set of contacts which when closed completes a holding circuit for itself and also completes an energizing circuit for said first relay, a contact making wattmeter connected to said power circuit and having overpower and underpower closing contacts, said overpower closing contacts being connected to short circuit said second relay when they close and said underpower closing contacts being in an energizing circuit for said second relay.

6. In combination, an electric power circuit, an electric furnace, a relay for controlling the connection and disconnection of said furnace to and from said circuit, a timer for positively causing said relay to maintain said furnace connected to said circuit during the first portion of successive time cycles, and means including a contact making wattmeter and said timer for causing disconnection of said furnace from said circuit during the latter portion of said time cycles if the load on said circuit exceeds a predetermined value.

7. In combination, an electric power circuit, an electric furnace, a contactor for connecting said furnace to said circuit when said contactor is energized and for disconnecting said furnace from said circuit when said contactor is deenergized, a normally closed circuit for energizing said relay, two sets of electrically parallel contacts connected in said last mentioned circuit, a timer for periodically opening and closing one of said sets of contacts in a definite time cycle, and a contact making wattmeter for causing opening of the other set of contacts when the load on said power circuit exceeds a predetermined value and for causing closure of said other set of contacts when the load on said circuit is below a predetermined value.

BURNHAM COGSWELL.